(12) United States Patent
Albrecht et al.

(10) Patent No.: US 7,183,517 B2
(45) Date of Patent: Feb. 27, 2007

(54) PORTABLE WELDING-TYPE APPARATUS WITH INTERCHANGEABLE ENERGY STORAGE DEVICE

(75) Inventors: Bruce Albrecht, Hortonville, WI (US); Jon Reynolds, Appleton, WI (US); Bernard J. Vogel, Troy, OH (US)

(73) Assignee: Illinois Tool Works, Inc., Glenview, IL (US)

( * ) Notice: Subject to any disclaimer, the term of this patent is extended or adjusted under 35 U.S.C. 154(b) by 217 days.

(21) Appl. No.: 10/707,202

(22) Filed: Nov. 26, 2003

(65) Prior Publication Data

US 2005/0109748 A1 May 26, 2005

(51) Int. Cl.
*B23K 9/10* (2006.01)

(52) U.S. Cl. .................................... 219/130.4
(58) Field of Classification Search ............. 219/130.1, 219/130.31, 130.32, 130.33, 130.4, 130.5
See application file for complete search history.

(56) References Cited

U.S. PATENT DOCUMENTS

| | | | |
|---|---|---|---|
| 3,665,495 A | 5/1972 | Carter et al. | |
| 4,182,949 A | 1/1980 | Powers et al. | |
| 4,315,163 A | 2/1982 | Bienville | |
| 4,525,621 A | 6/1985 | Puschner et al. | |
| 4,590,357 A | 5/1986 | Winkler | |
| 4,705,934 A | 11/1987 | Winkler | |
| 4,801,780 A | 1/1989 | Hayes | |
| 5,086,208 A | 2/1992 | Habermann | |
| 5,198,698 A | 3/1993 | Paul et al. | |
| 5,233,159 A | 8/1993 | Day | |
| 5,250,786 A | 10/1993 | Kikuchi et al. | |
| 5,253,891 A | 10/1993 | Carlin et al. | |
| 5,410,126 A | 4/1995 | Miller et al. | |
| 8,040,555 | 3/2000 | Tiller et al. | |
| 6,111,215 A | 8/2000 | Lilly | |
| 6,225,596 B1 | 5/2001 | Chandler et al. | |
| 6,331,694 B1 | 12/2001 | Blankenship | |
| 6,472,846 B1 | 10/2002 | Hutchinson et al. | |
| 6,476,354 B1 | 11/2002 | Vinzenz et al. | |
| 6,512,201 B2 | 1/2003 | Blankenship | |
| 6,552,303 B1 * | 4/2003 | Blankenship et al. | 219/130.5 |
| 6,700,214 B2 | 3/2004 | Ulinski et al. | |
| 6,700,802 B2 | 3/2004 | Ulinski et al. | |

(Continued)

FOREIGN PATENT DOCUMENTS

GB 2316244 A 2/1998

(Continued)

OTHER PUBLICATIONS

English Translation of Japanese document No. JP56-77068A.*

(Continued)

*Primary Examiner*—Clifford C. Shaw
(74) *Attorney, Agent, or Firm*—Ziolkowski Patent Solutions Group, SC (57) ABSTRACT

The present invention is directed to a portable welding-type power source including a removable energy storage device configured to provide a first voltage output and a boost circuit connected to the energy storage device and configured to boost the first voltage output to a second voltage output to supply power to the welding-type power source according to a selected welding-type process.

36 Claims, 6 Drawing Sheets

U.S. PATENT DOCUMENTS

| | | |
|---|---|---|
| 6,713,708 B2 | 3/2004 | Hedberg |
| 6,747,246 B2 * | 6/2004 | Crandell, III ............ 219/130.1 |
| 6,777,649 B2 | 8/2004 | Reynolds et al. |
| 6,818,860 B1 | 11/2004 | Stava et al. |
| 6,833,683 B2 | 12/2004 | Winkler |
| 2002/0023908 A1 | 2/2002 | Blankenship |
| 2004/0195998 A1 | 10/2004 | Winkler |

FOREIGN PATENT DOCUMENTS

| | | | |
|---|---|---|---|
| JP | 54-155950 A | 12/1979 | |
| JP | 56-77068 A * | 6/1981 | ............ 219/130.4 |
| JP | 61-135479 A | 6/1986 | |
| JP | 4-327375 A | 11/1992 | |
| JP | 4-356372 A | 12/1992 | |
| JP | 05318117 A | 12/1993 | |
| JP | 6-182548 A | 7/1994 | |
| JP | 10-314939 A | 12/1998 | |

OTHER PUBLICATIONS

Battery Welder brochure—Output 70-150A, MIGHT ARC, , Publisher: Might Industrial Co., Ltd., Published in: JP.

* cited by examiner

PORTABLE WELDING-TYPE APPARATUS WITH INTERCHANGEABLE ENERGY STORAGE DEVICE

BACKGROUND OF INVENTION

The present invention relates generally to welding systems and, more particularly, to a welding-type apparatus designed for portability. The welding-type apparatus includes an interchangeable energy storage device to generate a power output for a selectable welding-type process.

Power driven tools make up a large percentage of consumer and commercial tools. Traditional power driven tools receive driving power from corded attachment to a power receptacle. However, it is generally known that cordless tools that are not restricted by cords or cables for operation are preferred. As such, power tools driven by an energy storage device, typically a battery, have become an industry mainstay. Such battery driven power tools, or "cordless" power tools, allow for the use of the power tool where and when transmission or engine driven power is unavailable or impractical.

However, while cordless power tools are pervasive in the market, there are specific areas of the tool market that have yet to successfully adapt the tool to be driven by an energy storage device. Often, while cordless power tools are preferred, the cordless version of the traditional power tool usually includes a performance drop. For example, cordless power tools often operate at a lower power than the traditional counterpart. Furthermore, cordless power tools require frequent recharging that may interfere with a user's desire to utilize a cordless power tool to perform an extensive undertaking. That is, to complete an extensive undertaking the user must make frequent breaks to recharge a depleted battery else keep multiple batteries on-hand to be interchanged with depleted batteries.

Additionally, many traditional power driven tools require power levels above levels feasibly attained from energy storage devices. That is, the battery configurations required to supply the level of power necessary to effectively utilize the power tool would be overly cumbersome so as to render the power tool effectively non-portable.

For example, a typical welder designed for Shielded Metal Arc Welding, generates an output open circuit voltage between 45 and 75 volts, while a typical welder designed for Gas Metal Arc Welding generates an output open circuit voltage between 30 and 45 volts. To deliver comparable performance when powered from an energy storage device, multiple batteries would be required. Specifically, to generate the maximum desired open circuit voltage of 75 volts, a combination of seven traditional 12 volt batteries would be required. However, the inclusion of seven traditional 12 volt batteries in a "portable" MIG welder would render the device too cumbersome to be portable. Additionally, such a welder would not be cost effective.

To overcome this problem, welders have been developed that operate within the desired output range with a minimized battery configuration that still permits portability. Specifically, an output of the battery configuration is connected directly to the output of the welder to allow maximum power transfer. However, such minimized battery configurations significantly limit the duration of operability of the welder. Specifically, operational duration may be limited to a few minutes at maximum operational power output. Furthermore, by directly connecting the output of the battery configuration to the welding output, the user is precluded from regulating the voltage output of the welder to tailor the welding process to the specific welding task.

It is therefore desirable to design a portable welder that provides an open circuit voltage comparable to traditional, corded, welders. Additionally, it is desirable to design a portable welder that includes output voltage or current control. Furthermore, such a welder should be cost effective and efficient to be attractive to the end user.

BRIEF DESCRIPTION OF INVENTION

The present invention is directed to a portable welding-type apparatus that overcomes the aforementioned drawbacks. Specifically, the present invention includes a portable welding-type power source including a removable energy storage device and voltage regulation to control the output voltage or current according to a selected welding-type process. The present invention also includes a charger to recharge the removable energy storage device and a removable control module to control operation of the welding-type apparatus.

In accordance with one aspect of the present invention, a portable welding-type power source is disclosed that includes an energy storage device configured to provide a first voltage output and a boost circuit connected to the energy storage device. The boost circuit is configured to boost the first voltage output from the energy storage device to a second voltage output to supply power to the welding-type power source according to a selected welding-type process.

In accordance with another aspect of the present invention, a method of performing a welding-type process is disclosed including receiving an input voltage from an energy storage device that is below a desired output voltage and increasing the input voltage above the desired output voltage of the welding-type process. The method further includes regulating the increased voltage to supply the desired output voltage and current of the welding-type process at an output of a welding-type apparatus.

According to another aspect of the present invention, a portable welding-type apparatus is disclosed that includes an interchangeable energy storage device configured to provide an output voltage less than a required voltage range for a welding-type process and a first converter connected to the energy storage device and configured to increase the output voltage of the energy storage device. A second converter is included to receive the increased output voltage from the first converter and regulate the increased output voltage to be within the required voltage and current range for the welding-type process.

According to yet a further aspect of the present invention, a rechargeable battery is disclosed that is configured for use with a welding-type apparatus and has an output less than that required by the welding-type apparatus.

According to another embodiment of the present invention, an apparatus is disclosed that includes an inter-changeable energy storage device configured to provide a first voltage output, a boost circuit connected to the energy storage device and configured to boost the first voltage output to a second voltage output, and a buck converter to receive the second voltage output from the boost circuit and regulate the second voltage output to be within a voltage and current range required by the apparatus.

According to still another embodiment of the present invention, an interchangeable control module is disclosed that includes a housing, a socket extending from the housing and configured for repeated engagement and disengagement with a welding-type apparatus and a control circuit enclosed within the housing and configured to control operation of the welding-type apparatus according to at least one of a plurality of operating modes.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

The present invention is directed to a welding-type apparatus and, more specifically, to a portable welding-type power source including voltage or current regulation to control the output according to a selected welding-type process and a removable energy storage device. The present invention also includes a charger to recharge the removable energy storage device.

As one skilled in the art will fully appreciate the hereinafter description of welding devices not only includes welders but also includes any system that requires high power outputs, such as heating and cutting systems. Therefore, the present invention is equivalently applicable with any device requiring high power output, including welders, plasma cutters, induction heaters, and the like. Reference to welding power, welding-type power, or welders generally, includes welding, cutting, or heating power. Description of a welding apparatus illustrates just one embodiment in which the present invention may be implemented. The present invention is equivalently applicable with systems such as cutting and induction heating systems. Additionally, the present invention is applicable in powered tool applications outside of welding-type apparatuses. That is, aspects of the current invention are readily applicable to a wide variety of cordless power driven tools.

Furthermore, one skilled in the art will readily recognize that aspects of the claimed invention are applicable in various applications apart from those expressed above. For example, it is contemplated that the boost and buck circuit configuration in conjunction with the energy storage device described herein is readily applicable to various consumer electronics applications. Additionally, it is contemplated that the control module described herein is also applicable in various consumer electronics applications outside of welding-type apparatuses. As a further example, it is contemplated that aspects of the current invention may be readily applicable in consumer electronic entertainment devices such as electronic children's toys and other such devices commonly known to employ rechargeable battery configurations where an increased voltage level is desired over and above that supplied by the energy storage device.

Figure 1:
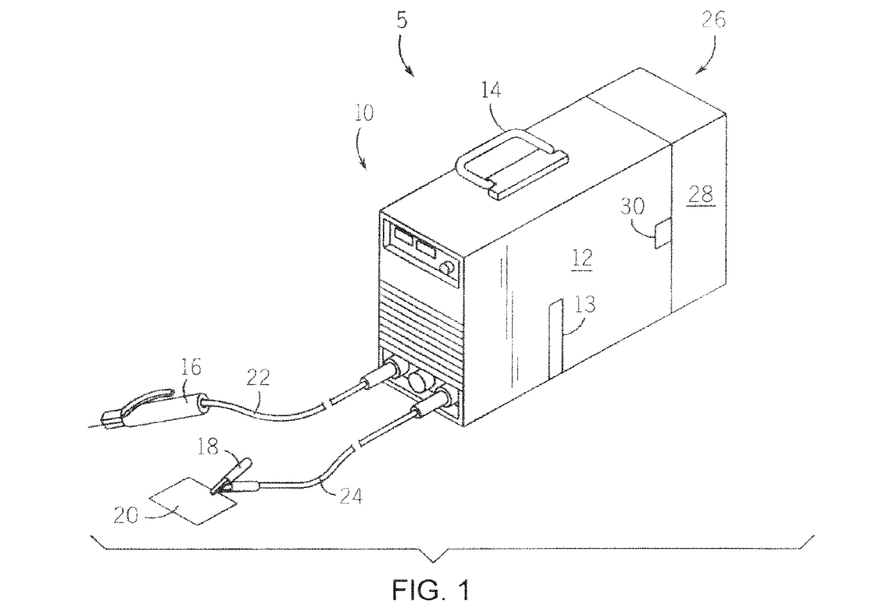
FIG. 1 is a perspective view of a welding-type apparatus incorporating the present invention.

Referring now to FIG. 1, a perspective view of a welding-type apparatus 5 incorporating the present invention is shown. Welding-type apparatus 5 includes a power source 10 that includes a housing 12 enclosing the internal components of power source 10. As will be described in greater detail below, housing 12 encloses a removable control module 13 including a boost converter and buck converter. Optionally, welding device 10 includes a handle 14 for transporting the welding system from one location to another. To effectuate the welding process, welding device 10 includes a torch 16 as well as a grounding clamp 18. Grounding clamp 18 is configured to ground a workpiece 20 to be welded. As is known, when torch 16 is in relative proximity to workpiece 20, a welding arc or cutting arc, depending upon the particular welding-type device, is produced. Connecting torch 16 and grounding clamp 18 to housing 12 is a pair of cables 22 and 24, respectively.

The welding arc or cutting arc is generated by the power source by conditioning raw power received from an interchangeable energy storage device 26. In a preferred embodiment, energy storage device 26 is a battery. Energy storage device 26 is interchangeable with similarly configured batteries. Specifically, energy storage device 26 is encased in a housing 28. Housing 28 is securable to the housing of welding device 10 thereby forming welding-type apparatus 5. Specifically, energy storage device 26 is secured to power source 10 by way of a fastening means 30. It is contemplated that fastening means 30 may include a clip, locking tab, or other means to allow energy storage device 26 to be repeatedly secured and released from power source 10.

Figure 2:
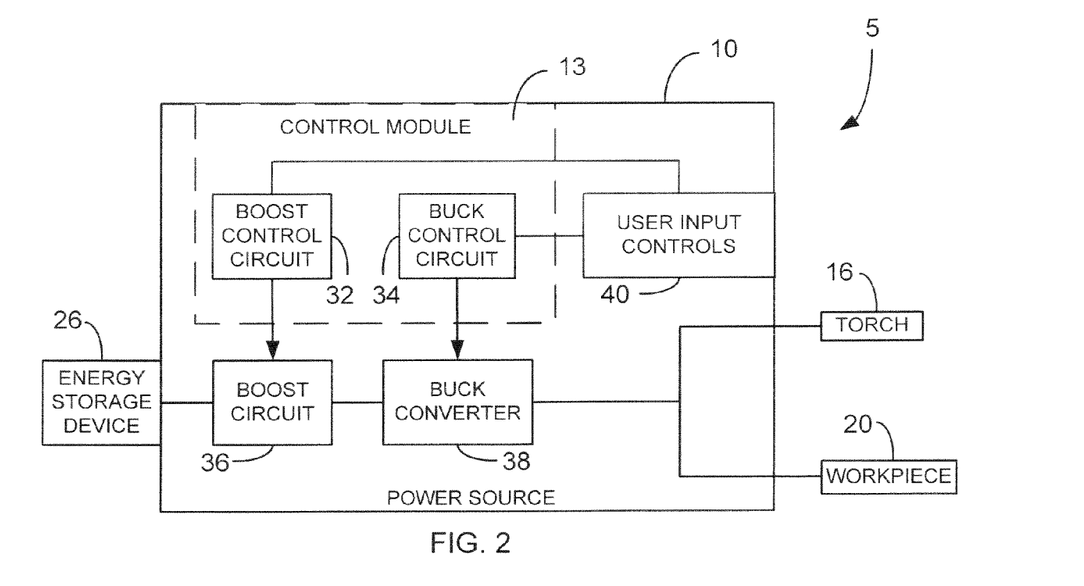
FIG. 2 is a block diagram of the components of the welding-type apparatus shown in FIG. 1.

Referring to FIG. 2, a block diagram of the components of welding-type apparatus 5 of FIG. 1 is shown. Specifically, welding-type apparatus 5 includes energy storage device 26 and power source 10. Within power source 10 is an interchangeable control module 13. Interchangeable control module 13 includes a boost control circuit 32 and a buck control circuit 34 to control the operation of a boost circuit 36 and a buck converter 38, respectively. Power source 10 also includes a user input control whereby a user or operator of welding-type apparatus 10 can select a desired welding-type process from a plurality of welding-type processes to be carried out with torch 16 on workpiece 20. That is, the present invention is capable of operating according to a plurality of welding-type process. For example, the welding-type apparatus may operate according to a MIG welding-type process, formerly known as Gas Metal Arc Welding-type process (GMAW), a Gas Tungsten Arc Welding-type process (TIG), or a Shielded Metal Arc Welding-type process (SMAW).

While the present invention is described in terms of utilizing boost circuit 36 and buck converter 38, it should be recognized that numerous similar circuits/converters are contemplated. That is, the substitution of a forward converter, resonant converter, Cuk converter, full-bridge converter, half-bridge converter and the like, is contemplated. Furthermore, while the present invention is described in terms of a multi-stage circuit, whereby one circuit increases a power parameter and another circuit regulates that power parameter, it is contemplated that a single stage circuit may be utilized to achieve both increasing and regulating the power parameter.

Figure 3:
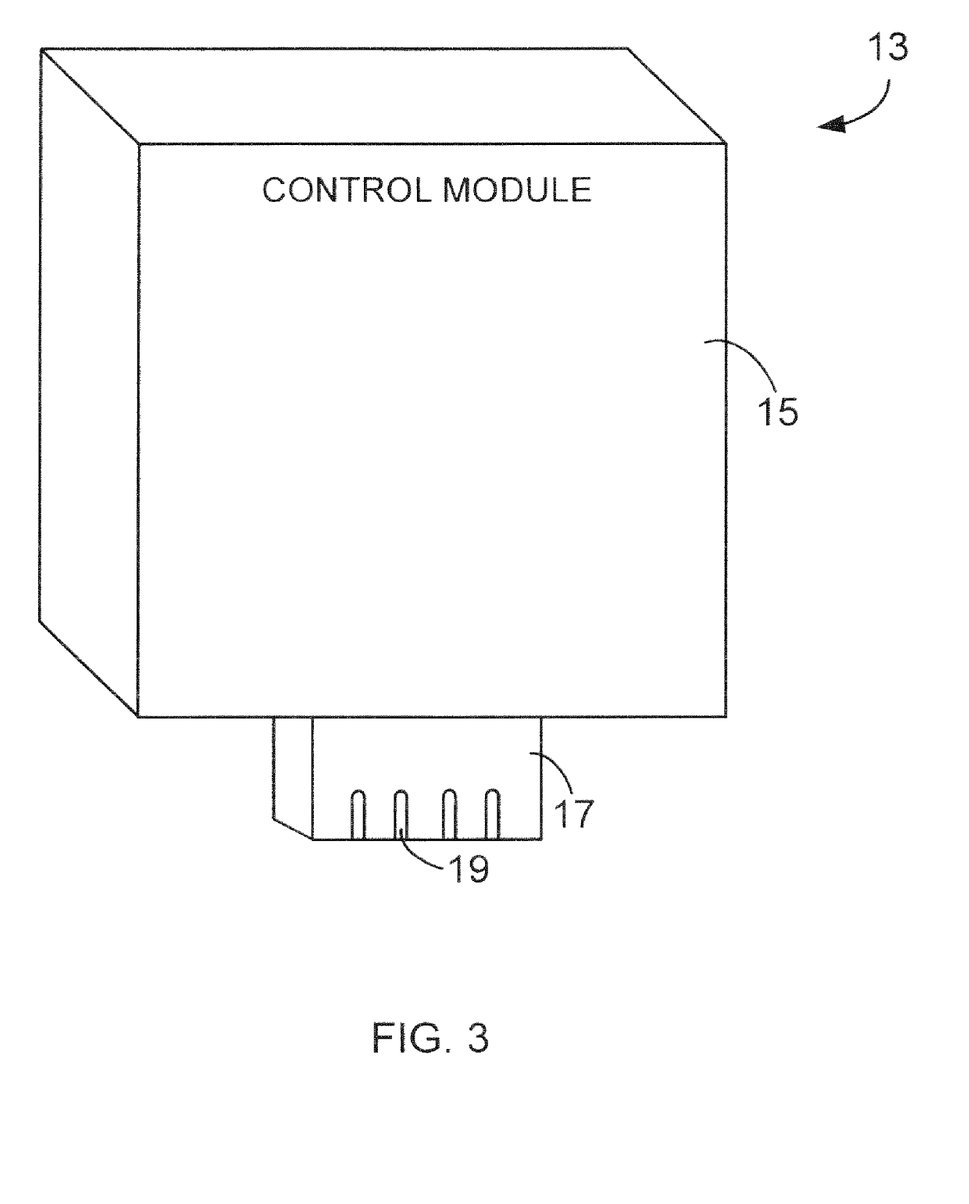
FIG. 3 is a perspective view of a control module in accordance with the present invention.

To enable the welding-type apparatus to operate according to a plurality of welding-type process with a plurality of operational requirements, control module 13 is interchangeable with other control modules whereby each control module is specifically configured to control the operation of boost circuit 36 and buck converter 38 to operate according to a particular welding-type process. Referring to FIG. 3, control module 13 includes a housing 15 surrounding a control circuit and configured to be received by the welding-type apparatus such that control module 13 may be repeatedly engaged and disengaged with the welding-type apparatus. Specifically, control module 13 includes a socket 17 configured to engage a receptacle of the welding-type apparatus. Socket 17 includes contacts 19 that establish an electrical connection between control module 13 and the welding-type apparatus.

Referring again to FIG. 2, once a user has engaged control module 13 within power source 10, the user may select a desired welding-type process through a user input control 40. Upon user entry of a selected welding-type process, user input control 40 determines whether a control module 13 that corresponds to the selected welding-type process has been inserted into power source 10. If so, boost control circuit 32 and buck control circuit 34 of control module 13 are instructed to begin operation of the selected welding-type process. Accordingly, power is delivered from energy storage device 26 and received by boost circuit 36 whereby voltage from the received power is boosted. Buck converter 38 receives the boosted power and regulates the voltage or current output at torch 16 to deliver an output power specific to the requirements of the selected welding-type process. As such, energy storage device 26 has an output voltage less than that required by the selected welding-type process.

As stated, the user input control determines whether control module 13 corresponds to the selected welding-type process. If it is determined that control module 13 is not matched to the selected welding-type process, the user is prompted to remove the current control module and replace it with a control module matched to the selected welding-type process. As will be described in detail below, once the appropriately matched control module 13 is secured in power source 10, boost control circuit 32 and buck control circuit 34 control boost circuit 36 and buck converter 38, respectively.

Figure 4:
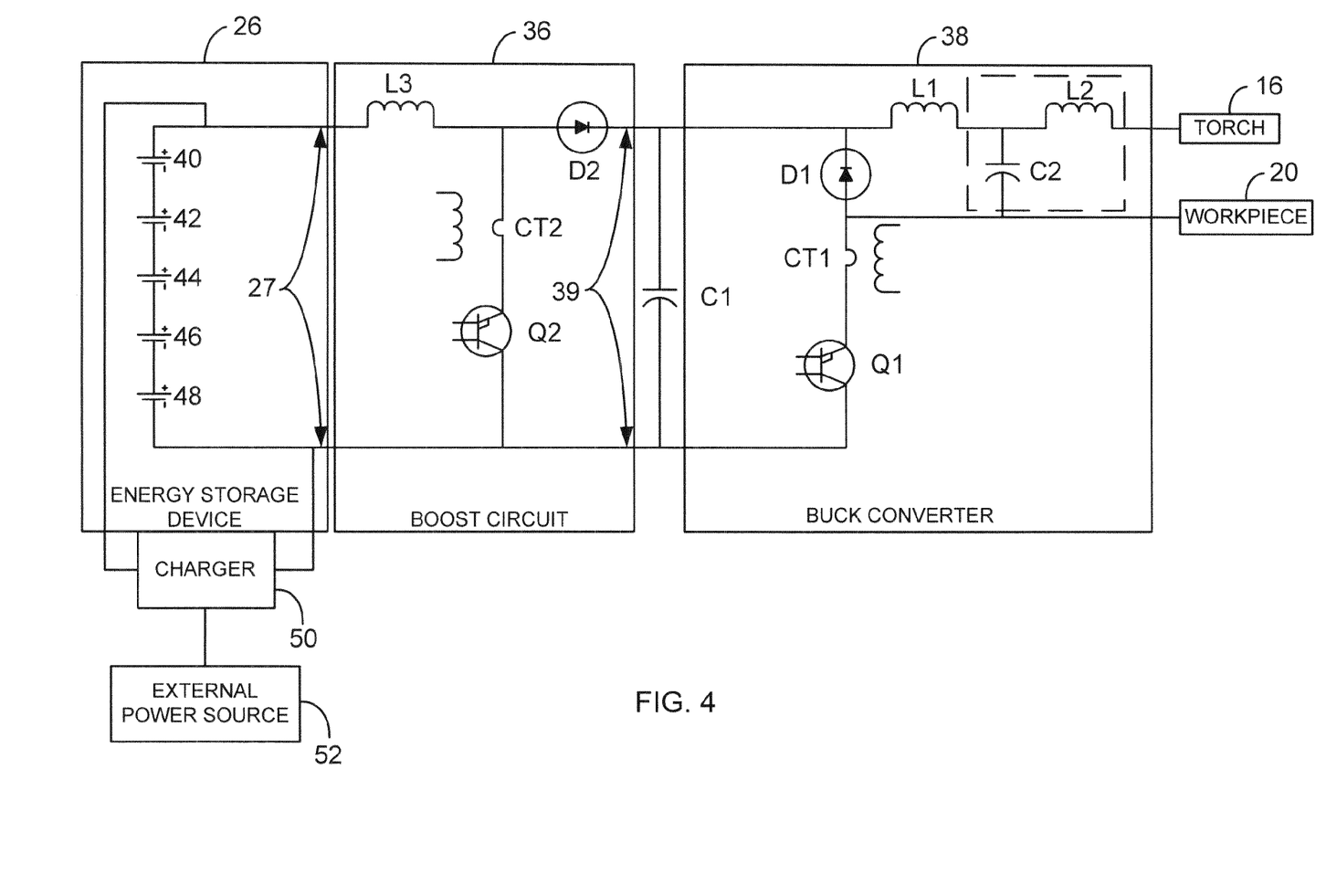
FIG. 4 is a detailed circuit diagram of the components of FIG. 2.

Referring to FIG. 4, a detailed circuit diagram illustrating some of the major components of energy storage device 26, boost circuit 36, and buck converter 38 are shown. FIG. 4 is intended to be illustrative of the major components and configuration of boost circuit 36 and buck converter 38 but is not intended to be representative of all circuitry and components incorporated within energy storage device 26, boost circuit 36, or buck converter 38.

Energy storage device 26 can include a plurality of independent energy storage devices 40–48. In a preferred embodiment energy storage device 26 includes five sealed lead acid (SLA) 12 volt batteries 40–48 connected in series to provide a nominal voltage of 60 volts. However, it is contemplated that as few as a single battery may be connected to provide the required nominal voltage. As will be described in detail, the required output voltage for the selected welding-type process may be achieved with a nominal voltage as low as 12 volts, however, the specific battery configuration directly affects the duration of the welding-type process. That is, an ampere-hour (AH) capacity of the battery configuration is dependent upon the number of batteries in the configuration and the power requirement of the selected welding-type process and will determine the amount of welding that can be performed on a single charge of batteries 40–48. As such, a charger 50 having a charging circuit is connected across batteries 40–48 to provide additional power to the welding-type apparatus.

Energy storage device 26 is also connected to boost circuit 36 such that energy storage device 26 provides a first output voltage 27 to boost circuit 36. Boost circuit 36 includes a control transformer such as current transformer CT2. Boost circuit 36 also includes inductor L3, discrete switch Q2, diode D2, and capacitor C1 to form a power circuit for a boost circuit 36. Capacitor C1, current transformer CT1, inductor L1, diode D1, and discrete switch Q1 form a power circuit of buck (chopper) converter 38 which receives a second output voltage 39 of boost circuit 36. Buck converter 38 may also include additional components such as capacitor C2 and inductor L2 that may be added for a constant voltage output required by some welding-type processes, such as GMAW type processes. The output of buck converter 38 is then supplied across torch 16 and workpiece 20 to effectuate the selected welding-type process.

As stated, charger 50 is configured to receive power from an external power source 52. It is contemplated that external power source 52 may be a transmission power receptacle, a portable generator, a generator, a turbine, a fuel cell, a scissors lift or a vehicle. It is further contemplated that charger 50 may be incorporated within external power source 52. That is, charger 50 may be integrated with external power source 52. As such, it is contemplated that the charger 50 and external power source 52 may be integrated within a vehicle, such as a truck or forklift. However, it is also contemplated that the charger 50 be integrated with energy storage device 26 or with power source 20. As such, it is contemplated that the entirety of the system be integrated. Furthermore, it is contemplated that the entirety of the system be integrated within a vehicle.

In any case, when charger 50 is connected to external power source 52 and power source 10, charger 50 conditions raw power received from external power source 52 for use by the welding-type apparatus. Specifically, if the welding-type apparatus is not operating to perform a selected welding-type process, the power from charger 50 is directed to recharge batteries 40–48.

On the other hand, if the welding-type apparatus is operating to perform a selected welding-type process, the power from charger 50 is utilized to supplement the power supplied by batteries 40–48 for the welding-type process. Furthermore, in accordance with one embodiment, residual power input from charger 50, may be used to charge energy storage device 26 during the selected welding-type process. As such, the power required from energy storage device 26 to sustain the selected welding-type process is reduced and duration of the selected welding-type process is extended.

It is also contemplated that batteries 40–48 be configured to solely provide output power during the selected welding-type process regardless of the inclusion of charger 50. In this case, charger 50 is configured to only provide charging power to batteries 40–48 when the welding-type apparatus is not in operation. That is, during an "on" time of a duty cycle of the selected welding-type process, batteries 40–48 provide output power. Then during an "off" time of the duty cycle, charger 50 provides charging power to batteries 40–48 to recharge batteries 40–48 for the next "on" time of the duty cycle. As such, the duration of the welding-type process is also extended as the batteries are intermittently recharged during the welding-type process.

Charging or otherwise, during a selected welding-type process, the output of the energy storage device is supplied to boost circuit 36. Typical welding-type processes such as SMAW and GMAW require an open circuit voltage in the range of 45 to 75 volts, however, as stated, energy storage device 26 has an output between 12 to 60 volts. Since the output voltage of energy storage device 26 may be lower than the open circuit voltage required by the selected welding-type process, a means of boosting the voltage is required.

As such, the output of energy storage device 26 is supplied to boost circuit 36. Discrete switch Q2 is turned on and off under pulse width modulation (PWM) control at a switching frequency, for example, 20 kHz. When discrete switch Q2 is turned on, the full output voltage of energy storage device 26 is applied across inductor L3, causing current to increase in a linear fashion. This current increase is sensed by current transformer CT2 during the time that discrete switch Q2 is on. The sensed current is used by the control circuit (not shown) for setting the pulse width of discrete switch Q2. In accordance with one aspect of the invention, the maximum switching duty cycle of discrete switch Q2 must be limited to around 90% to allow sufficient time for the core of current transformer CT2 to reset, when discrete switch Q2 switches off.

In accordance with an alternative embodiment, current transformer CT2 may be replaced with a Hall Effect current sensing device. The Hall Effect device could be placed in series with discrete switch Q2 or in series with inductor L3 to sense the current flowing in the boost circuit. Use of a Hall Effect current sensor could eliminate the 90% maximum duty cycle restriction for discrete switch Q2.

When discrete switch Q2 is turned off, the current flowing through inductor L3 continues to flow through diode D2 and into capacitor C1, or directly to buck converter 38. Under steady state conditions the voltage on capacitor C1 will be greater than energy storage device 26 output voltage, and so the current in inductor L3 decreases during the time the current is flowing through diode D2 because a reverse voltage is applied across inductor L3. Capacitor C1 serves to temporarily store energy from boost converter 36 until it is drawn out by buck converter 38.

Referring now to the operation of buck converter 38, discrete switch Q1 is also switched on and off under a PWM duty cycle control at a switching frequency, for example, 20 kHz. When operating in SMAW type process, whereby inductor L2 and capacitor C2 are switched out of the circuit, when a discrete switch Q1 is switched on, the voltage received from boost circuit 36 is applied across the series circuit that includes inductor L1 and the arc impedance between torch 16 and workpiece 20. The current that flows through discrete switch Q1 after it has turned on is the same as the output load current. Current transformer CT1 is used to sense the pulsed current flowing through discrete switch Q1 to provide a signal proportional to the output load current. This proportional current signal is used by the PWM controller (not shown) to control the on/off duty cycle of discrete switch Q1.

When operating in a GMAW type process wherein a relatively constant open circuit voltage is required, inductor L2 and capacitor C2 are switched into buck converter 38. As such, capacitor C2 provides an instantaneous source of current for the welding load between torch 16 and workpiece 20. The GMAW process may require instantaneous current which may be 3 to 4 times the magnitude of the average welding current and capacitor C2 can provide this source of energy. Alternately, in accordance with another embodiment of the invention, capacitor C2 can be eliminated if the switching components of diode D1 and discrete switch Q1 are such that they are capable of meeting the stringent voltage and current requirements of a GMAW process. Inductor L2 performs the function of controlling the rate of change of current into the welding arc as the arc impedance fluctuates under the welding-type process. Additionally, in accordance with an alternative embodiment, inductor L2 may be eliminated whereby the rate of change of current is controlled electronically by the control circuit.

The use of current transformers CT1, CT2 for sensing pulsed current, provides a low cost, low loss means of sensing current. In addition current transformers CT1, CT2 circuit can produce a signal with high signal to noise ratio without dissipating a significant amount of power.

In accordance with an alternative embodiment, current transformers, CT1 and CT2 may be replaced with Hall Effect current sensors. The Hall Effect sensor may be placed in series with discrete switches Q1 and Q2, or in series with the input or outputs of the boost and buck converters, such as in series with inductor L3 and in series with inductor L1. The use of a Hall Effect current sensor would eliminate the 90% restriction on the maximum duty cycle of discrete switches Q1 and Q2.

In accordance with one embodiment of the invention, the maximum duty cycle of discrete switch Q1 is limited to around 90% on time, to allow sufficient time to reset the core of current transformer CT1. When discrete switch Q1 switches off, the load current will continue to flow through diode D1 until the next switching cycle. In the illustrated embodiment, discrete switch Q1 is shown as a single IGBT switch, however, it represents multiple lower current devices operated in parallel to carry the full output current. The same is true for diode D1, diode D2 and discrete switch Q2.

Additionally, the output of boost circuit 36 will flow into either capacitor C1 or directly to the output of buck converter 38 via inductor L1. Consequently, the current supplied by buck converter 38 is either supplied from the energy stored in capacitor C1 or directly from the current supplied from boost circuit 36 via diode D2. To minimize the energy storage requirements of capacitor C1 it is desirable that the current supplied by boost circuit 36 be supplied directly to the buck converter 38 rather than temporarily stored in capacitor C1. By driving boost circuit 36 and buck converter 38 from a common clock signal such that the PWM command signal of buck converter 36 is phase shifted from the PWM command signal of boost converter 38, the energy storage requirements of capacitor C1 can be minimized. Some of the energy transferred between boost circuit 36 and buck converter 38 will still be stored in capacitor C1 because of the differences that will occur between the amplitude of the current in boost circuit 36 versus the amplitude of the current in buck converter 38. There can also be a difference in the switching duty cycle of boost circuit 36 and buck converter 38 that will affect the amount of energy stored in capacitor C1. However, by phase shifting the on time of discrete switch Q1 relative to the on time of discrete switch Q2, it is possible to minimize the energy storage requirement of capacitor C1.

Figure 5:
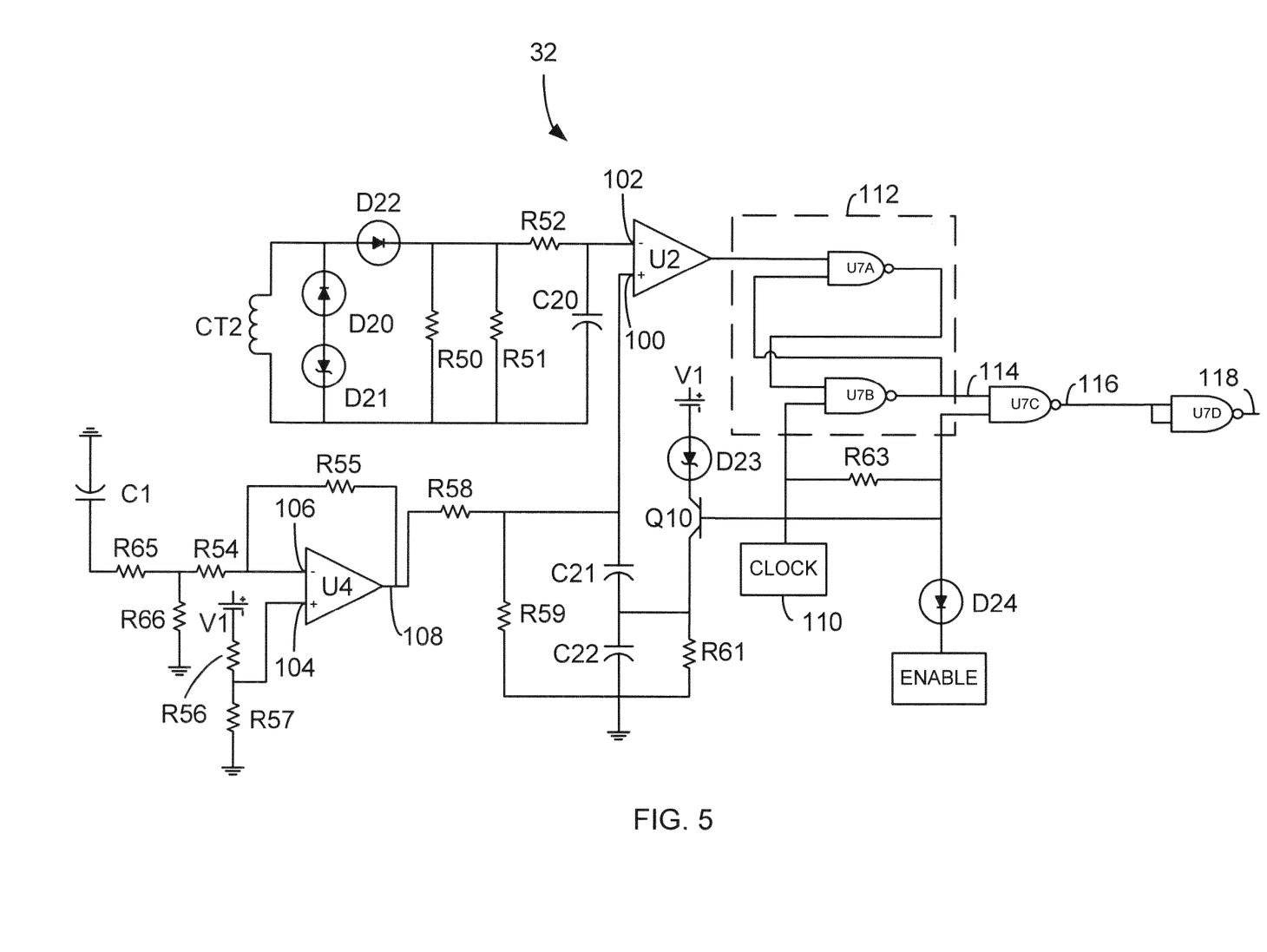
FIG. 5 is a detailed circuit diagram of a boost control circuit in accordance with the present invention.

Referring now to FIG. 5, boost control circuit 32 of FIG. 2 is shown in detail. As explained with respect to FIG. 4, current transformer CT2 detects the current flowing through discrete switch Q2 when discrete switch Q2 is on. Current transformer CT2 develops a voltage signal, which is proportional to the pulsed current in discrete switch Q2. The output signal from current transformer CT2 is delivered via diode D22 across parallel resistors R50 and R51. A resistor R52 and a capacitor C20 form a low pass filter to reduce noise on the output signal from current transformer CT2.

The reset of current transformer CT2 is performed by a diode D20 and a Zener diode D21.

A positive input 100 of a voltage comparator U2 is supplied with a reference signal as will be described in detail below. The level of the reference signal is set by a voltage error amplifier U4. The voltage across boost output capacitor C1 is sampled by resistors R65 and R66. A voltage command level is set by resistors R56 and R57, which appears on a positive input 104 of voltage error amplifier U4. The voltage command level set by resistors R56 and R57 is the desired output voltage from boost circuit 36 of FIG. 4, which is in the range of 60 to 70 volts depending upon the selected welding-type process. Resistors, R54 and R55 set the gain of voltage error amplifier, U4. An output 108 of voltage error amplifier U4 is scaled by resistors R58 and R59 to limit the maximum current of the boost circuit to the desired level.

An exponential ramp signal is AC coupled onto a capacitor C21 to avoid sub-harmonic oscillation. Specifically, a clock signal is supplied via a clock input 110. During the low portion of the clock signal, a discrete switch Q10 resets the voltage across a capacitor C22. A biasing supply V1 and a biasing diode D23 is included to operate discrete switch Q10. During the high portion of the clock signal, discrete switch Q10 is off and resistor R61 serves to partially discharge capacitor C22. As such, a decaying ramp signal is created that is AC coupled onto the reference signal via capacitor C21.

Accordingly, when a negative input 102 of voltage comparator U2, exceeds the voltage of the reference signal on positive input 100, the output of voltage comparator U2 will switch to a low state. NAND gates U7A and U7B operate as a latch 112 to latch off a gate signal until the end of the switching cycle, upon which the latch is reset by the low portion of the clock signal from clock input 110. Upon latching of latch 112, a low condition is forced to appear on an output 114 of NAND gate U7B, which forces a high condition on an output 116 of NAND gate U7C according to the clock signal from clock input 110 supplied via resistor R63. This high condition on NAND gate U7C is inverted, which forces a low condition on an output 118 of NAND gate U7D. Therefore, if the current sensed by current transformer CT2 and applied to negative input 102 of voltage comparator U2 is lower than the target level set by the reference voltage applied to positive input 100 of voltage comparator U2, the output of NAND gate U7D will operate to effectively widen the control signal, i.e. increase the pulse width.

Figure 6:
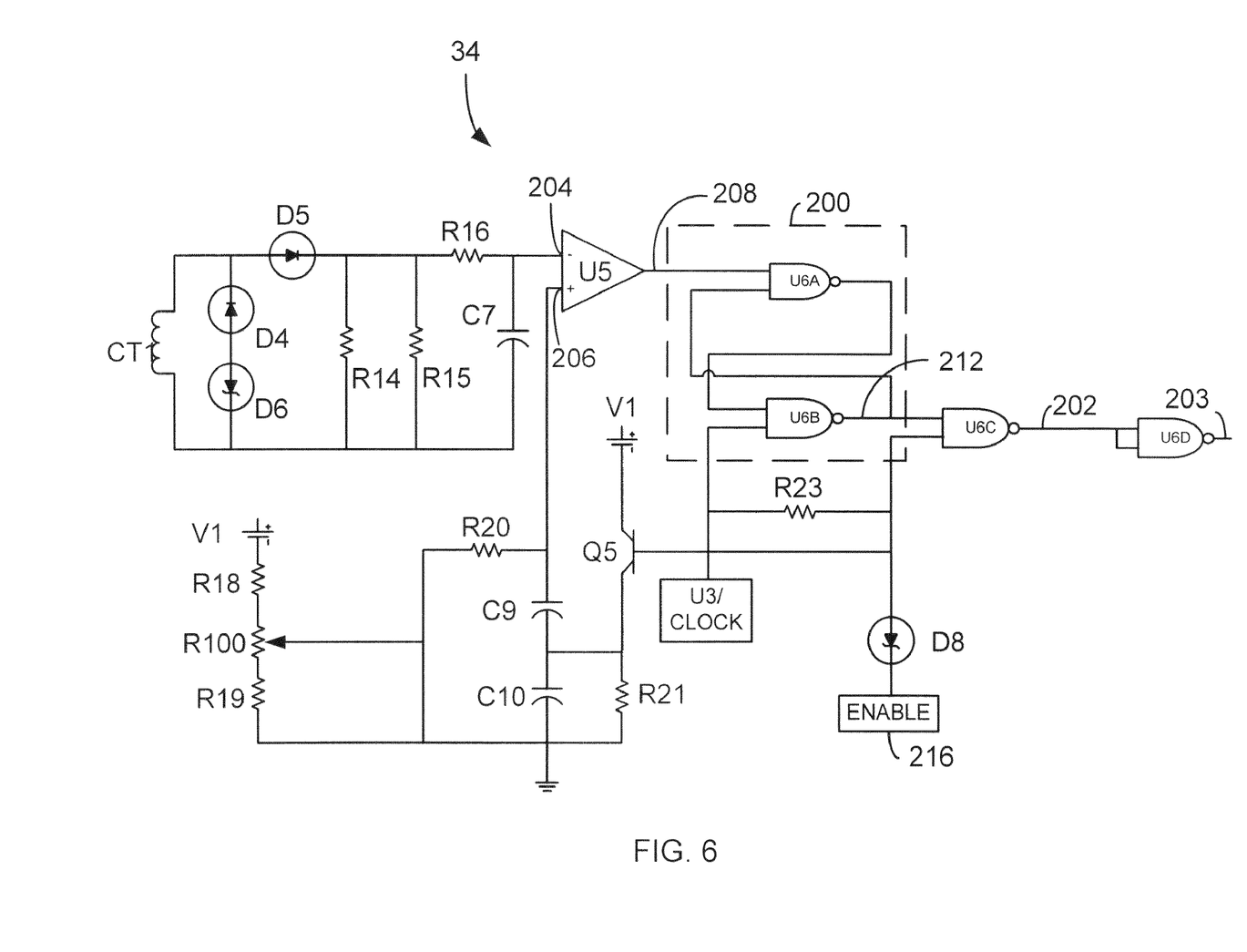
FIG. 6 is a detailed circuit diagram of a buck converter control circuit configured for a welding-type process in accordance with the present invention.

Accordingly, the PWM control of discrete switch Q2 of FIG. 4, is accomplished by sensing the pulsed current through discrete switch Q2 and comparing it to a reference with a DC level set by output 108 of FIG. 5, of error amplifier U4 of FIG. 6. That is, error amplifier output 108 sets a command level for the peak current in discrete switch Q2 of FIG. 4, which, in turn, controls the amount of current or energy supplied to capacitor C1. The output of voltage error amplifier U4 of FIG. 5 will vary as required to maintain the voltage across capacitor C1 relatively constant.

Additionally, in accordance with one embodiment of the current invention, an enable line 116 is provided via a diode D24, to allow the boost converter to be disabled in the event of low battery voltage or other such conditions.

Referring now to FIG. 6, the figure shows buck control circuit 34 to control buck converter 38 of FIG. 4 according to a SMAW type process. That is, FIG. 6 shows a detailed circuit layout of buck control circuit 34 of an interchangeable control module configured to enable the welding-type apparatus to operate according to a SMAW type process. Buck control circuit 34 utilizes an open loop peak current mode control scheme to control a switching duty cycle of discrete switch Q1, of FIG. 4. As such, when a user engages a SMAW buck control circuit 34, as shown in FIG. 6, within the welding-type apparatus of FIG. 1, the welding-type apparatus is controlled to operate according to a SMAW type process.

A free running timer sub-circuit U3 operates to create a clock signal. The clock signal has a duty cycle (high vs. low ratio) of approximately 90%. The 10% low portion of the clock signal serves two purposes. First, the 10% low portion serves to reset a latch 200 consisting of NAND gates U6A and U6B. Second, the 10% low portion serves to force a minimum off time of discrete switch Q1, FIG. 4, to allow the proper resetting of the core of current transformer CT1. The minimum off time works by forcing an output 202 of a NAND gate U6C to a high condition during the 10% low portion of the clock signal, via connection of the clock signal through resistor R23 to an input of NAND gate U6C. Another NAND gate U6D then inverts the signal from output 202 of NAND gate U6C to generate a logic gate drive signal at an output 203 of a NAND gate U6D, which drives discrete switch Q1, FIG. 4.

As stated with respect to FIG. 4, current transformer CT1 detects a pulse current flowing through switching transistor Q1. Current transformer CT1 thereby generates an output signal proportional to this pulse current, which in turn is proportional to the current at the output of the welding-type apparatus. As such, an output signal of current transformer CT1 is delivered across parallel resistors R14 and R15. A resistor R16 and capacitor C7 form a low pass filter to reduce noise on the output signal of current transformer CT1. The output signal of current transformer CT1 is thereby applied to a negative input terminal 204 of a voltage comparator U5. A reset of current transformer CT1 is performed by a diode D4 and a Zener diode D6. The reset voltage is preferably set to at least 10 times the level of voltage of the output signal of current transformer CT1 supplied via a diode D5 and developed across resistors R14 and R15 so that the core of current transformer CT1 can reset within the approximately 10% low portion of the clock signal from timer sub-circuit U3.

A positive input 206 of voltage comparator U5 is supplied with a reference signal. The level of the reference voltage is set by a reference voltage source V1 and fixed resistors R18 and R19 in conjunction with variable resistor, R100. Variable resistor R100 operates as an output current setting control. As such, a reference voltage is supplied directly to R20.

An exponential ramp signal is AC coupled onto this DC level, by capacitor C9 to avoid sub-harmonic oscillation. During the low portion of the clock signal from timer sub-circuit U3, a discrete switch Q5 is turned on to reset a voltage level on a capacitor C10. During the high portion of the clock signal, discrete switch Q5 is off, and a resistor R21 serves to partially discharge capacitor C10. As such, a decaying ramp type signal is created on capacitor C10, which is AC coupled through a capacitor C9 onto the reference signal at positive input 206 of voltage comparator U5.

When the output signal of current transformer CT1 applied to negative input 204 of voltage comparator U5 exceeds the voltage of the reference signal applied to positive input 206, an output of comparator 208 will switch to a low state. Accordingly, NAND gates U6A and U6B operate as a latch 200 to latch off the gate signal until the end of the switching cycle. At the end of the switching cycle, the latch is reset by the low portion of the clock signal from timer sub-circuit U3. Latch 200 forces a low condition to appear on an output 212 of U6B, which forces a high condition on output 202 of U6C, which, in turn, is inverted and forces a low condition on output 203 of U6D to generate a drive signal.

Accordingly, if the current sensed by current transformer CT1 is lower than the target level set by the reference voltage applied to positive terminal 206 of comparator U5, the pulse width of drive signal output 203 from U6D will increase. Therefore, the PWM control of discrete switch Q1 of FIG. 4 is accomplished by sensing of the pulsed current through discrete switch Q1 and comparing it to a reference with a DC level set by the output current control, resistor R100.

Furthermore, the ramp signal, which is AC coupled onto the reference signal, serves an additional purpose. That is, for narrower pulse widths, the current sensed by current transformer CT1 rises to a higher level to intersect the reference signal. Furthermore, for longer pulse widths, the current does not have to reach as high of a level to intersect the reference signal. This is because of the decaying ramp signal coupled to the command reference via C9. As such, a natural droop of the output of buck converter 34, FIG. 4, is achieved. For SMAW it is desirable to have a certain amount of droop characteristic so that the arc impedance between the torch and workpiece decreases under certain conditions. For example, a droop characteristic is desirable for SMAW during a short circuit or when starting the arc, such that the current naturally increases to assist in clearing the short.

Additionally, in accordance with one embodiment of the current invention, an enable line 216 is provided via a diode D8, so that the output of the buck converter can be disabled for a low battery condition or other undesirable conditions such as over-heating. Specifically, when enable single 216 is low, discrete switch Q1 of FIG. 4 will remain in an off state and no voltage will be present across the output of the welding-type apparatus.

Figure 7:
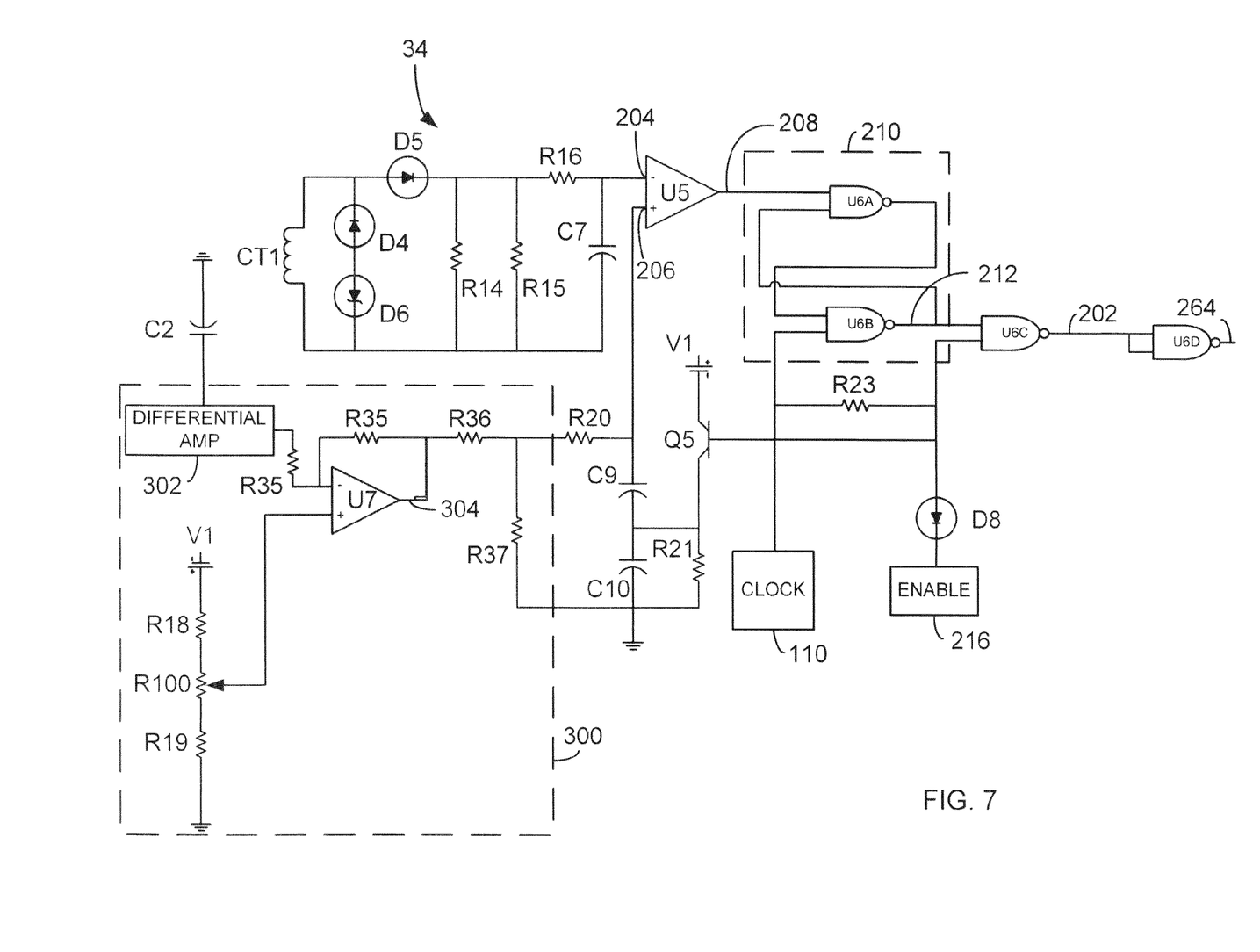
FIG. 7 is a detailed circuit diagram of a buck converter control circuit configured for another welding-type process in accordance with the present invention.

Referring now to FIG. 7, the figure shows a modification to buck control circuit 34 of FIG. 6 to control buck converter 38 of FIG. 4 to operate according to a GMAW type process. That is, when a GMAW control module is engaged within the welding-type apparatus, buck control circuit 34 is modified to add a circuit section 300. Specifically, circuit section 300 of buck control circuit 34 has been modified to enable a relatively constant voltage output from the buck converter to be supplied to the output of the welding-type apparatus, such as is required to perform welding-type processes such as GMAW.

A differential amplifier 302 has been added to sense the output voltage across capacitor C2 and provide a scaled signal proportional to the output voltage of the welding-type apparatus. Alternately, in accordance with one embodiment of the invention, differential amplifier 302 senses the voltage output of the welding-type apparatus rather than the voltage across capacitor C2. That is, while the voltage across capacitor C2 will tend to be a smoother signal than output voltage of the welding-type apparatus, the voltage does not include the DC voltage drop across inductor L2.

A second amplifier, error amplifier U7, has also been added. An output control command signal is set by fixed resistors R18 and R19 and variable resistor R100. Therefore, a reference voltage is supplied to error amplifier U7 rather than directly to R20 as in the SMAW buck control circuit, as shown in FIG. 6. An output 304 of error amplifier U7 now provides the reference voltage to resistor R20 via resistors R36 and R37, which sets a peak current level in discrete switch Q1 of FIG. 4. Resistors R36 and R37 of FIG. 7 have been added to scale the output of the error amplifier to keep the current within the same range as with the SMAW converter control. Resistors R34 and R35 set the gain of amplifier U7.

The rest of the control operates as described above with respect to the control circuit for SMAW. The primary difference in operation is that the reference voltage will vary as required to maintain the output voltage of the converter constant as the arc impedance varies. By adjusting resistor R100, a user is able to set the output voltage level of the welding-type apparatus.

Therefore, in accordance with one embodiment of the present invention, a portable welding-type power source is disclosed that includes an energy storage device configured to provide a first voltage output and a boost circuit connected to the energy storage device. The boost circuit is configured to boost the first voltage output from the energy storage device to a second voltage output to supply power to the welding-type power source according to a selected welding-type process.

According to another embodiment of the present invention, a method of performing a welding-type process is disclosed that includes receiving an input voltage from an energy storage device that is below a desired output voltage and increasing the input voltage to the desired output voltage of the welding-type process. The method further includes regulating the increased voltage to supply the desired output voltage and current of the welding-type process at an output of a welding-type apparatus.

According to yet a further embodiment of the present invention, a portable welding-type apparatus is disclosed that includes an interchangeable energy storage device configured to provide an output voltage less than a required voltage range for a welding-type process and a first converter connected to the energy storage device and configured to increase the output voltage of the energy storage device. A second converter is included to receive the increased output voltage from the first converter and regulate the increased output voltage to be within the required voltage and current range for the welding-type process.

In accordance with another embodiment, a rechargeable battery is disclosed that is configured for use with a welding-type apparatus and has an output less than that required by the welding-type apparatus.

In accordance with yet another embodiment, an apparatus is disclosed that includes an interchangeable energy storage device configured to provide a first voltage output, a boost circuit connected to the energy storage device and configured to boost the first voltage output to a second voltage output, and a buck converter to receive the second voltage output from the boost circuit and regulate the second voltage output to be within a voltage and current range required by the apparatus.

In accordance with another embodiment, an interchangeable control module is disclosed that includes a housing, a socket extending from the housing and configured for repeated engagement and disengagement with a welding-type apparatus and a control circuit enclosed within the housing and configured to control operation of the welding-type apparatus according to at least one of a plurality of operating modes.

The present invention has been described in terms of the preferred embodiment, and it is recognized that equivalents, alternatives, and modifications, aside from those expressly stated, are possible and within the scope of the appending claims.

What is claimed is:

1. A portable welding-type power source comprising:
   a rechargeable energy storage device configured to provide a first voltage output;
   a boost circuit connected to the energy storage device and configured to boost the first voltage output to a second voltage output to supply power to the welding-type power source according to a selected welding-type process; and
   a chopper circuit configured to receive the second voltage output and convert the second voltage output to a power output matched to the selected welding-type process.

2. The welding-type power source of claim 1 wherein the boost circuit comprises a boost converter.

3. The welding-type power source of claim 1 wherein the chopper circuit comprises a buck converter.

4. The welding-type power source of claim 1 further comprising at least one control module to control the boost circuit and the chopper circuit according to the selected welding-type process.

5. The welding-type power source of claim 4 wherein the control module further comprises a first control circuit to control operation of the boost circuit and a second control circuit to control operation of the chopper circuit.

6. The welding-type power source of claim 5 wherein the first and the second control circuits are controlled by a common clock signal such that a required mutual capacitance between the boost circuit and the chopper circuit is reduced.

7. The welding-type power source of claim 1 wherein the power output includes a required output voltage and current range that varies according to the selected welding-type process and wherein the second circuit is controlled to regulate the second voltage output according to the selected welding-type process.

8. The welding-type power source of claim 1 wherein the energy storage device is readily interchangeable with replacement energy storage devices.

9. The welding-type power source of claim 1 wherein the selected welding-type process is one of a shielded metal arc welding-type process, gas metal arc welding process, gas tungsten arc welding process, plasma cutting process, and a heating apparatus.

10. The welding-type power source of claim 1 wherein the energy storage device is a battery pack that is interchangeable with other battery packs.

11. The welding-type power source of claim 1 further comprising a charger configured to receive power from an external source.

12. The welding-type power source of claim 11 wherein the charger is configured to be removable.

13. The welding-type power source of claim 11 wherein the charger further comprising a charging circuit and wherein the energy storage device may be recharged via the charging circuit.

14. The welding-type power source of claim 13 wherein the charging circuit is configured to receive power from an external power source to provide the energy storage device with recharging power.

15. The welding-type power source of claim 14 wherein the external power source is one of a transmission power receptacle, a portable generator, a generator and turbine, a fuel cell, a vehicle, and a scissors lift.

16. The welding-type power source of claim 13 wherein the charging circuit is configured to supplement the second voltage output during the selected welding-type process when the charging circuit is provided with power from an external power source.

17. A method of performing a welding-type process comprising:
    receiving an input voltage from a rechargeable energy storage device that is below a desired output voltage;
    increasing the input voltage at least to the desired output voltage of the welding-type process;
    regulating the increased voltage to supply the desired output voltage and current of the welding-type process at an output of a welding-type apparatus; and
    receiving a charging voltage from an external power supply and providing the charging voltage to the energy storage device to recharge the energy storage device.

18. The method of claim 17 further comprising supplementing the input voltage with the charging voltage.

19. The method of claim 17 wherein the welding-type process is one of shielded metal arc welding, gas metal arc welding, gas tungsten arc welding, plasma cutting, and a heating apparatus.

20. The method of claim 17 further comprising adjusting the desired output voltage and current according to the welding-type process.

21. A portable welding-type apparatus comprising:
    an interchangeable energy storage device configured to provide an output voltage less than a required voltage range for a welding-type process;
    a first converter connected to the energy storage device and configured to increase the output voltage of the energy storage device;
    a second converter to receive the increased output voltage from the first converter and regulate the increased output voltage to within the required voltage and current range for the welding-type process; and
    a charger configured to supply a charging voltage to the interchangeable energy storage device.

22. The portable welding-type apparatus of claim 21 wherein the second converter is configured to regulate the increased output voltage to within a required voltage and current range for a plurality of welding-type process with a plurality of required voltage and current ranges.

23. The portable welding-type apparatus of claim 21 further comprising a control module including at least one control circuit to control the first converter and the second converter.

24. The portable welding-type apparatus of claim 21 further comprising an interchangeable control module configured to control operation of welding-type apparatus to operate according to one of a plurality of welding-type processes.

25. The portable welding-type apparatus of claim 24 further comprising a user input control configured to receive user selection of one of the plurality of welding-type processes and wherein upon receipt of the user selection the user input control determines whether the interchangeable control module corresponds to the user-selected welding-type process.

26. The portable welding-type apparatus of claim 25 wherein the first converter is further configured to increase the output voltage of the energy storage device and the second converter is further configured to regulate the increased output voltage to within the required voltage and current range for the user-selected welding-type process upon confirmation from the user input control that the interchangeable control module corresponds to the particular welding-type process.

27. The portable welding-type apparatus of claim 25 wherein user input control is further configured to preclude the welding-type apparatus from operating according to the user-selected welding-type process if the interchangeable control module does not corresponds to the user-selected welding-type process.

28. The portable welding-type apparatus of claim 24 wherein the interchangeable control module further comprises a first control circuit to control the operation of the first converter and a second control circuit to control the operation of the second converter.

29. The portable welding-type apparatus of claim 24 wherein the plurality of welding-type processes at least includes a GMAW type process and a SMAW type process.

30. The portable welding-type apparatus of claim 21 wherein the first converter and the second converter comprise at least one of a boost circuit, a buck converter, forward converter, a resonant converter, a Cuk converter, a full-bridge converter, a voltage multiplier, and a half-bridge converter.

31. The portable welding-type apparatus of claim 21 wherein an output of the welding-type apparatus may be one of a constant current output and a constant voltage output as derived from the increased output voltage.

32. An apparatus comprising:
an interchangeable rechargeable energy storage device configured to provide a first voltage output;
a boost circuit connected to the energy storage device and configured to boost the first voltage output to a second voltage output; and
a buck converter to receive the second voltage output from the boost circuit and regulate the second voltage output to be within a voltage and current range required by the apparatus.

33. The apparatus of claim 32 further comprising a charger configured to recharge the interchangeable energy storage device from an external power source.

34. The apparatus of claim 33 wherein charger is integrated with the external power source.

35. The apparatus of claim 34 wherein the charger and external power source comprise one of a vehicle, a turbine, a fuel cell, and a generator.

36. The apparatus of claim 32 wherein the apparatus comprises one of a vehicle, a turbine, a fuel cell, and a generator.

* * * * *